(12) United States Patent
Liu et al.

(10) Patent No.: US 9,300,468 B2
(45) Date of Patent: *Mar. 29, 2016

(54) SECURE NODE ADMISSION IN A COMMUNICATION NETWORK

(71) Applicant: Entropic Communications, Inc., San Diego, CA (US)

(72) Inventors: Changwen Liu, San Diego, CA (US); Ronald B. Lee, San Diego, CA (US)

(73) Assignee: ENTROPIC COMMUNICATIONS, LLC, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,328

(22) Filed: Feb. 24, 2014

(65) Prior Publication Data

US 2014/0169558 A1  Jun. 19, 2014

Related U.S. Application Data

(63) Continuation of application No. 12/820,382, filed on Jun. 22, 2010, now Pat. No. 8,699,704, which is a continuation-in-part of application No. 12/686,645, filed on Jan. 13, 2010, now abandoned.

(60) Provisional application No. 61/144,570, filed on Jan. 14, 2009.

(51) Int. Cl.
*H04L 9/00* (2006.01)
*H04L 9/08* (2006.01)
(Continued)

(52) U.S. Cl.
CPC ............ *H04L 9/0861* (2013.01); *H04L 9/0863* (2013.01); *H04L 9/0891* (2013.01);
(Continued)

(58) Field of Classification Search
CPC ............ H04L 9/0861; H04L 2463/061; H04L 63/061; H04L 9/0863; H04L 9/0891; H04L 9/3226; H04L 9/3271
USPC .................. 713/150, 168, 171; 370/254–255; 380/28–30, 255, 44
See application file for complete search history.

(56) References Cited

U.S. PATENT DOCUMENTS

2002/0059434 A1    5/2002 Karaoguz et al.
2002/0184488 A1*  12/2002 Amini et al. .................. 713/153
(Continued)

FOREIGN PATENT DOCUMENTS

CA    2638134     1/2010
CN    101222772   7/2008
(Continued)

OTHER PUBLICATIONS

First Chinese Office Action for Application No. 201180031243.6, dated Jan. 30, 2015, 8 pages.
(Continued)

*Primary Examiner* — Samson Lemma
(74) *Attorney, Agent, or Firm* — McAndrews, Held & Malloy, Ltd.

(57) ABSTRACT

A system and method for node admission in a communication network having a NC and a plurality of associated network nodes. According to various embodiments of the disclosed method and apparatus, key determination in a communication network includes an NN sending to the NC a request for a SALT; the NN receiving the SALT from the NC, combining the SALT with its network password to calculate a static key, and submitting an admission request to the network coordinator to request a dynamic key. The SALT can be a random number generated by the NC, and the admission request can be encrypted by the NN using the static key.

12 Claims, 8 Drawing Sheets

(51) Int. Cl.
*H04L 29/06* (2006.01)
*H04L 9/32* (2006.01)
*H04L 12/28* (2006.01)

(52) U.S. Cl.
CPC ............ *H04L9/3226* (2013.01); *H04L 9/3271* (2013.01); *H04L 12/2801* (2013.01); *H04L 12/2838* (2013.01); *H04L 63/061* (2013.01); *H04L 2012/284* (2013.01); *H04L 2012/2849* (2013.01); *H04L 2209/80* (2013.01); *H04L 2463/061* (2013.01)

(56) References Cited

U.S. PATENT DOCUMENTS

| | | | |
|---|---|---|---|
| 2005/0050328 A1* | 3/2005 | Mizrah | 713/171 |
| 2005/0289347 A1* | 12/2005 | Ovadia | 713/171 |
| 2008/0130897 A1 | 6/2008 | Donatelli et al. | |
| 2008/0130902 A1 | 6/2008 | Foo Kune et al. | |
| 2008/0178252 A1* | 7/2008 | Michaud | 726/1 |
| 2008/0222258 A1 | 9/2008 | Kwon et al. | |
| 2008/0247334 A1 | 10/2008 | Lee et al. | |
| 2008/0291885 A1 | 11/2008 | Miao et al. | |
| 2010/0031297 A1 | 2/2010 | Klein et al. | |
| 2010/0150016 A1* | 6/2010 | Barr | 370/252 |
| 2010/0293378 A1 | 11/2010 | Xiao et al. | |
| 2011/0145575 A1* | 6/2011 | Blommaert | H04L 63/083 713/168 |

FOREIGN PATENT DOCUMENTS

| | | |
|---|---|---|
| EP | 2247131 | 11/2010 |
| WO | 2009094941 | 8/2009 |
| WO | 2009106091 | 9/2009 |

OTHER PUBLICATIONS

Second Chinese Office Action for Application No. 201180031243.6, dated Aug. 11, 2015, 8 pages.
RSA Laboratories, PKCS#5 v2.1: Password-Based Cryptography Standard, Oct. 5, 2006, 34 pages.

* cited by examiner

SECURE NODE ADMISSION IN A COMMUNICATION NETWORK

CROSS-REFERENCE TO RELATED APPLICATIONS

This application is a continuation of copending U.S. application Ser. No. 12/820,382, filed Jun. 22, 2010, which was a continuation-in-part of U.S. application Ser. No. 12/686,645, filed Jan. 13, 2010, now abandoned, which claimed the benefit of U.S. Provisional Patent Application No. 61/144,570, filed Jan. 14, 2009. Each patent application identified above is incorporated here by reference in its entirety to provide continuity of disclosure.

TECHNICAL FIELD

The presently disclosed method and apparatus relates generally to communication networks, and more particularly, some embodiments relate to a method and apparatus for generating a key for secure admission of a node to a communication network.

DESCRIPTION OF THE RELATED ART

A home network may include many types of subscriber devices configured to deliver subscriber services throughout a home. These subscriber services include delivering multimedia content, such as streaming audio and video, through the home network to subscriber equipment. One example of such a home network is described with reference to FIG. 1. In this example, a wired communications medium 100 is shown. In some applications, the wired communications medium might be a coaxial cable system, a power line system, a fiber optic cable system, an Ethernet cable system, or other similar communications medium. In the one such embodiment, the communications medium 100 is preinstalled coaxial cabling deployed within a residence 101. Alternatively, the communications medium might be a wireless transmission system.

The network comprises a plurality of network nodes 102, 103, 104, 105, 106 in communication according to a communications protocol. For the purposes of this example, a network node is any device that is capable of communicating across the network to another device. Communications over the network might be organized in accordance with a networking standard, such as the Multimedia over Coax Alliance (MoCA®) standard. In one embodiment, a communications protocol defined by the networking standard specifies a packet based communications system. In this embodiment, physical layer (PHY) packets comprise preambles and payloads.

In some embodiments, activity on the network is controlled by a network coordinator (NC) node. In one such embodiment, one of the nodes is selected to perform the functions of the NC based upon a process defined by the communications protocol. In networks employing an NC, the NC schedules network communications between network nodes using a MAP. The NC also sends a beacon which allows nodes that are not part of the network to identify network signals and synchronize to the network. The MAP is sent as a packet. Such MAP packets are sent on a regular basis. The beacon is also a packet that is regularly sent by the NC. The NC also performs admission procedures when a new node (NN) requests admission to the network. For the purposes of this disclosure, the definition of the NN is a node that is requesting admission to a network.

Nodes in such a network can be associated with a variety of devices. For example, in a system deployed in a residence 101, a node may be a network communications module associated with a computer 109, 110. Such nodes allow the computer 109, 110 to communicate over the communications medium 100. Alternatively, a node may be a module associated with a television 111 to allow the television to receive and display media streamed from one or more other network nodes. Another node might also be associated with a speaker or other media playing device 103. A node might also be associated with a module configured to interface with an internet or cable service provider 112, for example to provide Internet access, digital video recording capabilities, media streaming functions, or network management services to the residence 101.

With networks such as the network described in the example provided above with respect to FIG. 1, multimedia content can be delivered to and shared among various network devices where the content is presented to a user or stored for later access. As the number of available subscriber services has increased and their popularity increases, the number of devices connected within each home network has also increased. With an increase in the number and variety of devices on the network, network security concerns have become more prevalent. For example, a network might be susceptible to attack by an outside node such as a node in a neighboring network 118. Accordingly, encryption techniques have become an increasingly important aspect of network privacy. In networks in which privacy is enabled, key derivation and key management mechanisms are used to facilitate encrypted communications. In a MoCA 2.0 network, for example, the well-known Advanced Encryption Standard (AES) cipher is used to encrypt messages with encryption keys. AES is the foundation for link privacy in MoCA 2.0.

In addition, in networks in which privacy is enabled, node admission is generally controlled to help ensure privacy. In many secure networks, such as MoCA, for example, node admission is controlled by an NC through an "admission process". In accordance with MoCA 2.0, a MoCA 2.0 NC is used to admit new MoCA 2.0 nodes (i.e., NNs). Admission messages in a MoCA 2.0 network are encrypted by one of two static keys. They are called static keys, because the value of the keys remains constant once determined for the network. The first of these static keys is known as "AES MAC Management Key" (AMMK). The AMMK is used to encrypt the initial admission messages and MAC control messages, except the link privacy messages. The "link privacy" messages include a message used to request a set of dynamic keys and a response message used to send the dynamic keys to a requesting node. The dynamic keys are discussed further below. The second of the static keys is known as "AES Initial Privacy Management Key" (APMKInitial). The link privacy messages communicated during and after an admission process are encrypted by APMKInitial.

FIG. 2 is a diagram illustrating one embodiment of an admission process for admitting a node to a MoCA 2.0 network. The figure represents time advancing from the top of the figure to the bottom. Referring now to FIG. 2, when a user wishes to add an NN 122 to a network, the user first determines the password of the network into which the user wishes to add the NN 122. That password is then directly entered into the NN 122. All of the nodes in a MoCA 2.0 network share the same network password. The network password is used to derive the keys for node admission and link privacy, as will be described below.

The NN 122 is then connected to the medium used by the network. The NN 122 listens for a beacon message 128 being sent by the network NC 124. Beacon messages 128 indicate a time slot during which NNs, such as an NN 122, can make a "discovery request" 130. A discovery request 130 is a request made by the NN 122 for information about the network. That information may include the types of devices that are currently admitted to the network and an identifying phrase used to identify the network (such as a network name). Once the beacon message 128 is received, the NN 122 sends a discovery request 128 at the time specified in a beacon message 128. In response, the NC 124 sends a "discovery response" 132 at a time that the NC 124 specifies in the next beacon message 131. Once the NN 122 receives the information in the discovery response 132, the NN 122 may decide to send a request for an admission slot 134 in another discovery request. A next beacon message 133 indicates the time at which the request for the admission slot 134 is to be sent. Alternatively, the NN 122 can send the request for an admission slot within the first discovery request.

Once the NC 124 receives the request for an admission slot 134, the NC 124 will schedule a time at which the NN 122 is to send an admission request. The admission request that is sent by the NN 122 is encrypted with the AMMK static key that is generated from the network password. In response, the NC 124 will provide an admission response. In addition, the NN 122 and the NC 124 will exchange additional messages, including probes and other messages that assist the NN 122 and NC 124 in establishing the nature of the channel between the NN 122 and the NC 124, as well as the nature of the channel between the NN 122 and other nodes of the network. The exchange of messages will result in the admission of the NN 122 into the network.

Once admitted into the network, if privacy is enabled, the NN 122 must request a pair of dynamic keys. That is, in addition to the two static keys, the MoCA 2.0 protocol uses two dynamic keys. These keys are called "dynamic" because they change periodically in order to enhance the security of the network. The dynamic keys are used to encrypt communications between admitted nodes of the network. In addition, in order to facilitate updates to the two dynamic keys, each of the two dynamic keys is generated as a pair consisting of an even key and an odd key. Taking the even and odd keys into account, there are a total of four dynamic keys in existence at any one time, only two of which are actively used to encrypt and decrypt messages, while the other two dynamic keys are being updated and made ready to become active.

In MoCA 2.0, the user-entered network passwords are assumed to be approximately 10 to 17 decimal digits long and are padded to 17 digits with leading zeros in accordance with a common format defined in MoCA 1.0. Using a padded password, the effective password length (or strength) is between 40 and 56 bits. Consequently, the strength of the user password-derived static keys (i.e., the AMMK and APMKInitial) is less than the 128 bits used by the AES encryption scheme used to generate the static keys. This results in a weaker key strength that suffers from many common vulnerabilities, such as pre-calculations of possible admission AES keys. This can allow the entire keyspace to be attacked in a brute-force attack, or likely key possibilities to be attacked in what are referred to as dictionary attacks.

One approach to improving the strength of the static key is to increase the length of the user password. However, this is not the most desirable route, as lengthier passwords tend to make it more difficult for users to memorize and input their network passwords. In addition, it is desirable to maintain backward compatibility of the password format in some networks. Accordingly, it would be desirable to strengthen the keys used with MoCA networks and other such networks that fall prey to this weakness without increasing the length of the password.

BRIEF SUMMARY OF EMBODIMENTS

According to various embodiments of the disclosed method and apparatus, nodes on a network (also referred to as network devices) are programmed to obtain a "SALT" for the network and to combine the SALT with their password (and in some cases, other data or information) to create one or more static keys for the network. In one embodiment of the disclosed method and apparatus, the SALT is a random number generated by the NC. The static keys are then used to obtain dynamic keys. The dynamic keys are used for post-admission network communications.

According to some embodiments, the following functions are performed in a method for allowing an NN to gain admission into a communication network having a network coordinator (NC) node and a plurality of associated network nodes. For the purposes of this disclosure, the definition of the NN is a node that is requesting admission to a network. The functions include:

(1) an NN sending to the NC a request for a SALT (it will be understood by those skilled in the art that in some MoCA networks, the SALT is sent in response to an NN sending a discovery request);
(2) the NN receiving the SALT from the NC, wherein in some embodiments, the SALT is a random number generated by the NC;
(3) the NN combining the SALT with its network password to calculate at least one static key;
(4) the NN using the static key(s) to perform the admission procedure to the network;
(5) the NN requesting a dynamic key, wherein the request is encrypted by the NN using at least one of the static keys;
(6) the NN receiving the requested dynamic key, wherein the received dynamic key is encrypted using at least one of the static keys; and
(7) the NN, after receiving the dynamic key, sending messages to other network nodes, the messages being encrypted using the dynamic key.

In one embodiment, the SALT is the same for all nodes seeking admission to the network. In addition, one network user determined password is used throughout the network. Accordingly, the same static keys are used for the admission process employed by all of the nodes that are granted admission to the network. The static key is calculated by applying a process known as "RFC 2898/PKCS#5" (as defined by RSA labs). The values of the SALT, the network password and an encoded string are used by the RFC 2898/PKCS#5 process to perform the calculation. In one example, the encoded string is the ASCII value for the phrase "MACManagementKey" or the ASCII encoded phrase "PrivacyManagementKey." This means that the string is the literal ASCII value of each of the letters "M", "A", "C", etc.

Alternatively, the static key can be generated by combining the SALT with the network password using any combination of a number of numerical functions, including hashing the SALT with the network password and/or an encoded string to calculate the static key.

In addition to the NN calculating a static key, the NC also combines the SALT with the network password to calculate a static key to be used by the NC for communications with the NN during and after the admission.

As should be clear from the above description, one embodiment of a system for performing the above operation includes an NC. The NC preferably has a processor. In addition, the NC has computer executable program code embodied on a computer readable medium. The executable program code is configured to cause the NC to perform the operations described above as being performed by the NC.

The system further includes an NN. The NN comprising a processor. In addition, the NN has computer executable program code embodied on a computer readable medium. The executable program code is configured to cause the NN to perform the operations described above as being performed by the NN.

Other features and aspects of the disclosed method and apparatus will become apparent from the following detailed description, taken in conjunction with the accompanying drawings, which illustrate, by way of example, the features in accordance with embodiments of the disclosed method and apparatus. The summary is not intended to limit the scope of the claimed invention, which is defined solely by the claims attached hereto.

BRIEF DESCRIPTION OF THE DRAWINGS

One or more embodiments of the disclosed method and apparatus are described in detail with reference to the following figures. The drawings are provided for purposes of illustration only and merely depict either typical embodiments or examples of particular embodiments of the disclosed method and apparatus. These drawings are provided to facilitate the reader's understanding of the disclosed method and apparatus and shall not be considered limiting of the breadth, scope, or applicability of the claimed invention. It should be noted that for clarity and ease of illustration these drawings are not necessarily made to scale.

DETAILED DESCRIPTION

Figure 1:
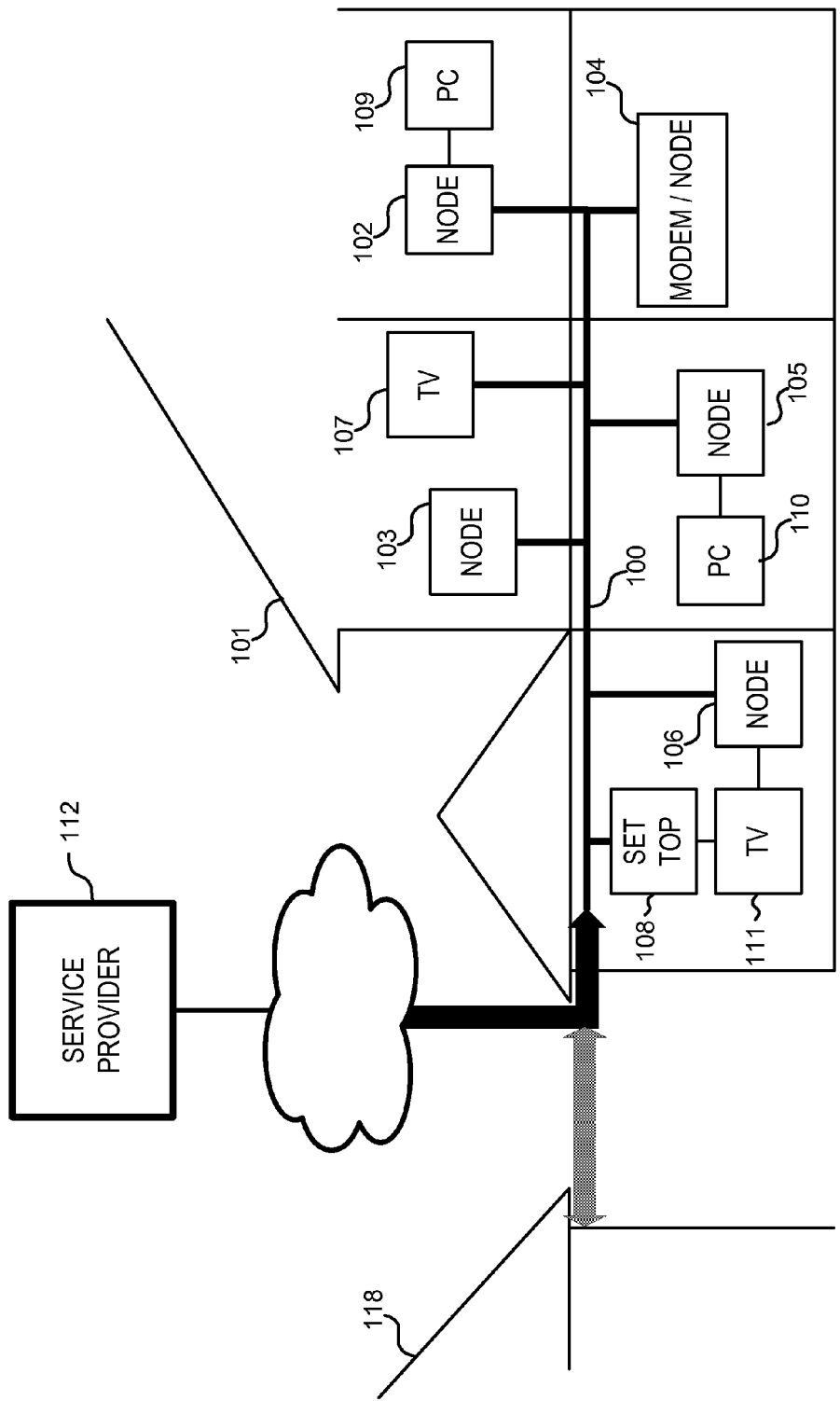
FIG. 1 illustrates an example of one environment in which some embodiments of the disclosed method and apparatus may be implemented.
Figure 2:
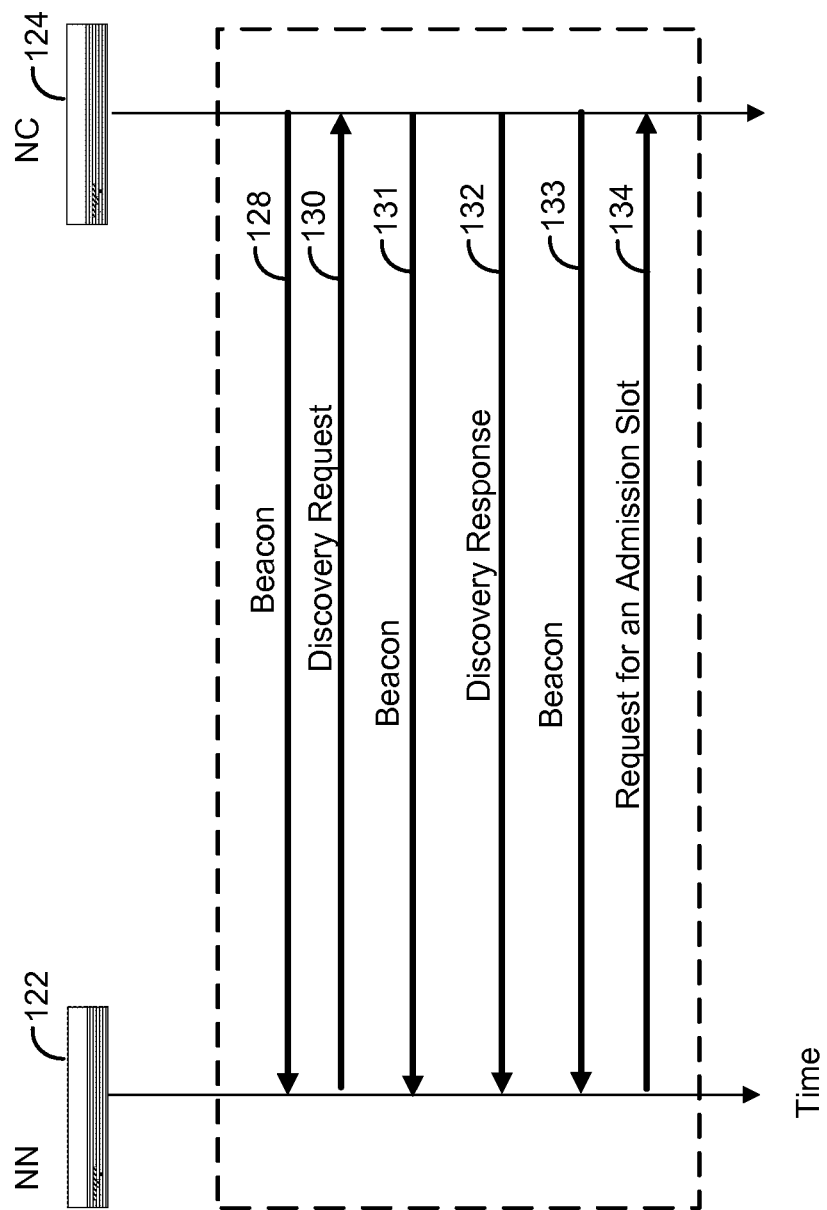
FIG. 2 is a diagram illustrating a conventional process for node admission using encryption.

In one embodiment of the disclosed method and apparatus, similar to networks that operate in accordance with MoCA 1.x and MoCA 2.0, a total of four encryption keys are used to gain admission and to communicate once a node (also referred to as a network device) is admitted. These four keys are specified in Table 1. There are two static keys and two dynamic keys.

TABLE 1

Encryption Keys

| Key Type | Key | Usage |
|---|---|---|
| Static Keys | AES MAC Management Key ("AMMK") | Encryption of MAC Control except for Link Privacy Messages. |
| | Initial AES Privacy Management Key ("APMKInitial") | Encryption of Link Privacy messages when the current APMK being used by the rest of the network is not available (e.g., prior to admission). |
| Dynamic Keys | AES Privacy Management Key ("APMK") | Encryption of Link Privacy messages when the current APMK being used by the rest of the network is available. |
| | AES Traffic Encryption Key ("ATEK") | Encryption of MAC Data Transmissions |

In one embodiment, the two static keys are used as admission keys. They are called "static" keys because they are based on a network password and a permanent SALT, and do not change unless the password or SALT are changed. The first of the static keys is an AES MAC Management Key ("AMMK") and second is an Initial AES Privacy Management Key ("APMKInitial").

In one such embodiment, the two "dynamic" keys change periodically in order to enhance the security of the network. The first of the dynamic keys is referred to as AES Privacy Management Key ("APMK"). The second of the dynamic keys is referred to as AES Traffic Encryption Key ("ATEK").

The AMMK is used for encryption of MAC Control Messages with the exception of any Link Privacy Messages. The Link Privacy Messages during the admission process are encrypted using the APMKInitial. Link Privacy Messages include messages used to transfer the dynamic keys to an NN during admission. For the purposes of this disclosure, the definition of the NN is a node that is requesting admission to a network.

The admission process may be performed at initialization (e.g. initial application of power, reset or after the power has been cycled) or when a node within the network loses synchronization with the NC. In accordance with one embodiment, if, for any reason, a node gets out of sync with the dynamic keys maintained by the NC, then the NC drops the node from the network. The node must then be re-admitted to the network using the static keys.

After admission and during normal network operations, ATEK is used to encrypt data messages. Furthermore, in normal network operations, APMK is used to encrypt Link Privacy messages after a node has been admitted.

According to various embodiments of the disclosed method and apparatus, a node that is seeking admission to a network initiates the admission process by sending a request for a SALT. In accordance with one such embodiment, the request for the SALT is made by sending a discovery request. That is, the SALT is sent to the NN in response to the NN sending a discovery request. In one embodiment, the SALT is a 96 bit long random value generated by the NC, although other bit lengths can be chosen. This random string is used as the SALT for all network admissions. The random string can be generated by one or more commonly known mechanisms. For example, a pseudorandom number generator module can be used to generate a sequence of numbers determined by a small set of initial values.

The SALT preferably does not change except when the network is re-formed, such as, for example if all nodes of the network suffer a power outage at the same time. When the network is re-formed, a new permanent SALT can be generated. Use of a permanent SALT means the NC does not need to recalculate static keys each time a node requests access. In one embodiment, the SALT is generated before the network is formed. Alternatively, the NC can generate the SALT once when the network is initially formed and then maintain that SALT value in memory for further use later as additional nodes request admission to the network. In some cases, the network is considered to have been initially formed when the second node is put onto the communication medium (for example, connected to the coaxial cable that is used as the communication medium). Accordingly, a request from the second node to join the network (the first node to request admission after an NC is established) starts a process for obtaining a SALT for the network.

In one embodiment, the request for the SALT may be made in the form of a "discovery request" sent from the NN. In one such embodiment, the request is sent to a Network Coordinator node (NC). The NC provides the SALT to a requesting node in a discovery response message sent by the NC to the requesting node. Alternatively, the NC may distribute the SALT during mixed mode operation, as described in more detail below. Alternatively, the SALT can be distributed to the nodes of the network by any messaging available between the nodes and the NC.

Once obtained, the SALT is combined with the requesting node's password to create the static keys. In one embodiment, an ASCII string is also used in the generation of the static keys. Details regarding the generation of the static keys is provide further below. Once generated, the static key is used to encrypt messages communicated between the NN and the NC during the admission process. In addition, the AMMK is used to encrypt MAC control messages (except for privacy messages) after the admission process is complete. The admission process results in obtaining the dynamic keys necessary for ongoing secure communications. It will be understood that other processes and functions may occur during the admission process that are not relevant to the disclosed method and apparatus for generating a static key. Once the dynamic keys are obtained, all network communications are encrypted by either the dynamic keys or the AMMK.

As noted above, it is important to provide as secure a network as possible. Ensuring that the static key is strong helps to ensure that the network remains secure. Accordingly, in one embodiment, a solution is provided that increases the strength of the key without increasing the length of the password. In one embodiment, the password length is 10 to 17 decimal digits, which is equivalent to 40 to 56 bits. As noted above, in one embodiment the SALT is 96 random bits, although other bit lengths can be chosen. Thus, the key space for the static keys, which are derived from both password and the SALT, has a nominal length of at least 136 (40+96) bits. This is greater than the AES key length of 128 bits. The initial values calculated for the static keys are then truncated to fit within the 128 bit AES key space. It will be understood that the length of the password can be increased as well to further enhance the strength of the key, depending on the security goals of the system.

Figure 3:
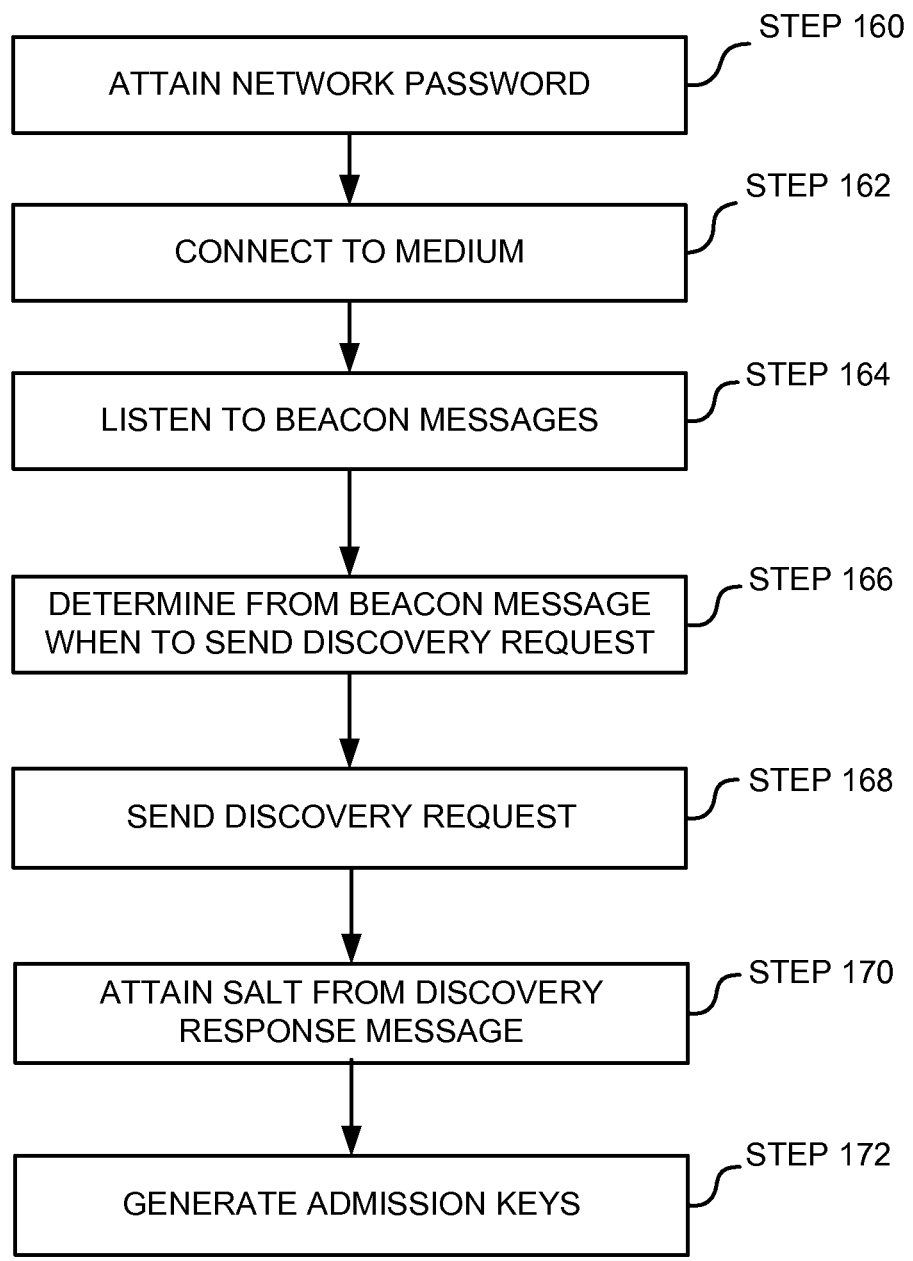
FIG. 3 is a diagram illustrating an example process for node admission in accordance with one embodiment of the systems and methods described herein.
Figure 4:
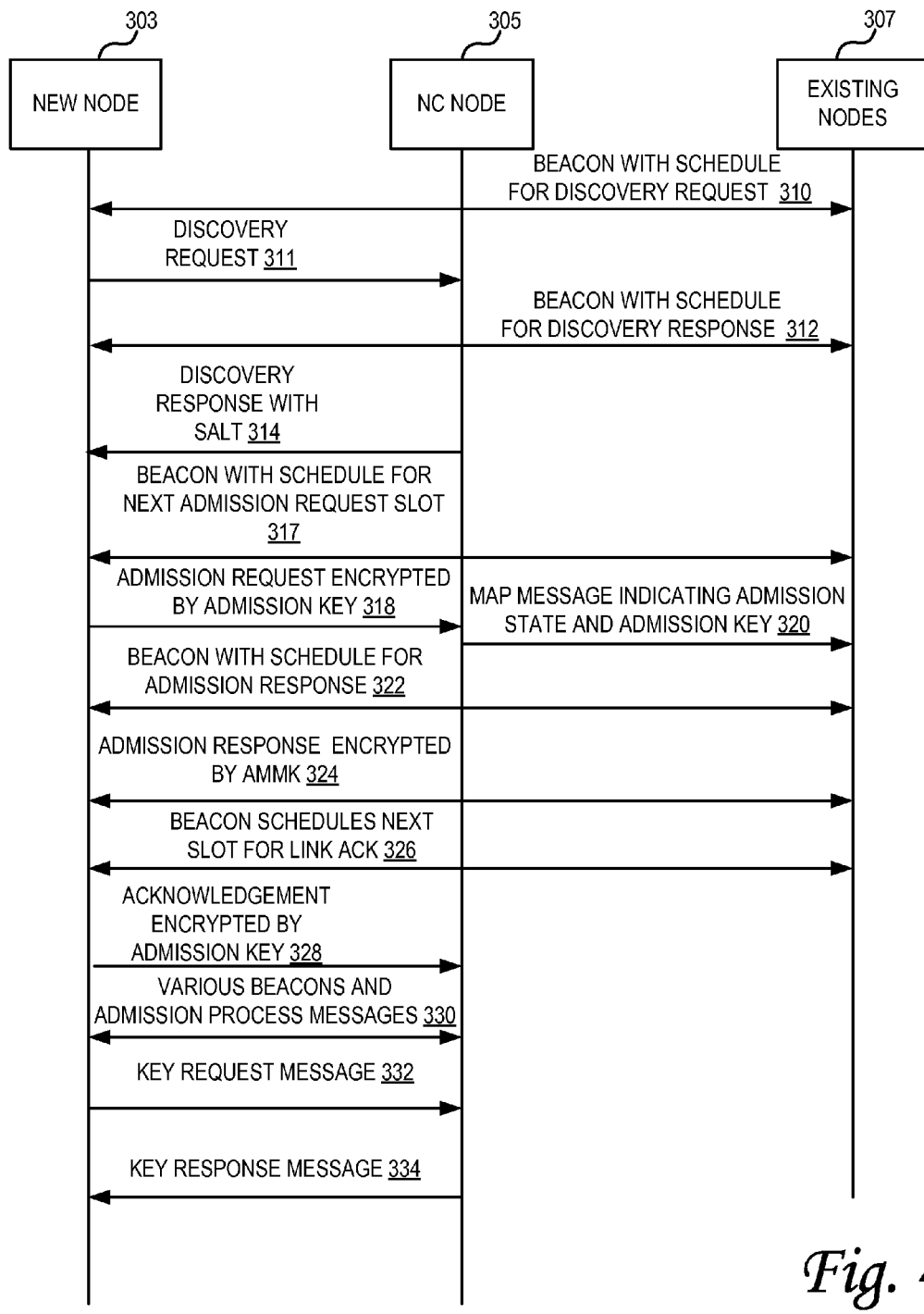
FIG. 4 is a diagram illustrating an example message flow for obtaining the static key in accordance with one embodiment of the systems and methods described herein.

FIG. 3 is a diagram illustrating one example of a process implemented by an NN 303 (shown in FIG. 4) that is not currently a member of a network. FIG. 4 is a diagram illustrating an example message flow for obtaining the static key in accordance with one embodiment of the systems and methods described herein. In order for the NN 303 to gain admission to the network, the NN 303 must attain the network password (STEP 160). In one embodiment, the user must enter the password of the network. Alternatively, in some embodiments, the network password can be attained by an auto-configure process in which the user can push a button on both the NN 303 and another node (such as the NC) once the NN 303 is plugged into the network medium. In yet another alternative, near field communication tokens are used to allow the NN 303 to attain the password without the user having to enter the password into the NN 303. In still another embodiment, the network password is coded into the NN 303 upon manufacture.

In the embodiment illustrated in FIG. 3, the NN 303 is connected to a network medium (STEP 162). In accordance with the disclosed method and apparatus, the NN 303 can attain the network password either before or after connection to the network. Once connected to the network medium, the NN 303 listens for a beacon message 310 from an NC 305 of a network that is currently formed on the medium (STEP 164). Once received, the beacon message 310 indicates when the NN 303 should send a discovery request 311 (STEP 166). The NN 303 can either include a request for an admission slot within the discovery request 311 (STEP 168), or postpone requesting an admission slot until after review of the information provided by the NC 305 in the discovery response 314. In either case, the NC 305 schedules a time slot when the NC 305 will send the discovery response 314. The schedule for the discovery response 314 is provided by the NC 305 in a beacon 312. A request for an admission slot causes the NC 305 to also schedule a time when the NN 303 can send an admission request 318.

The NC 305 sends a discovery response 314 at the time indicated in the beacon message 312. The discovery response 314 includes the SALT. In addition, if the NN 303 requested information about the network, that information would be included in the discovery response 314 as well. It should be noted that in one embodiment of the disclosed method and apparatus, the SALT is sent to the NN 303 whether the NN 303 requests an admission slot or not.

The NN 303 receives the discovery response 314 at the time indicated in the beacon message 312 and attains the value of the network SALT from the discovery response 314 (STEP 170). If the NN 303 included a request for an admission slot in the discovery request 311, a subsequent beacon message 317 will indicate when the NC 305 has scheduled the NN 303 to send an admission request 318.

The principle reason for requesting an admission slot within the discovery request 311 is to have the NC 305 schedule a time during which the NN 303 can send the admission request 318. The NN 303 generates one or more static keys using a combination of at least the network password and the SALT received in STEP 170. In one embodiment, the NN 303 uses an ASCII string in addition to the SALT and password to generate the static keys (STEP 172).

Figure 5:
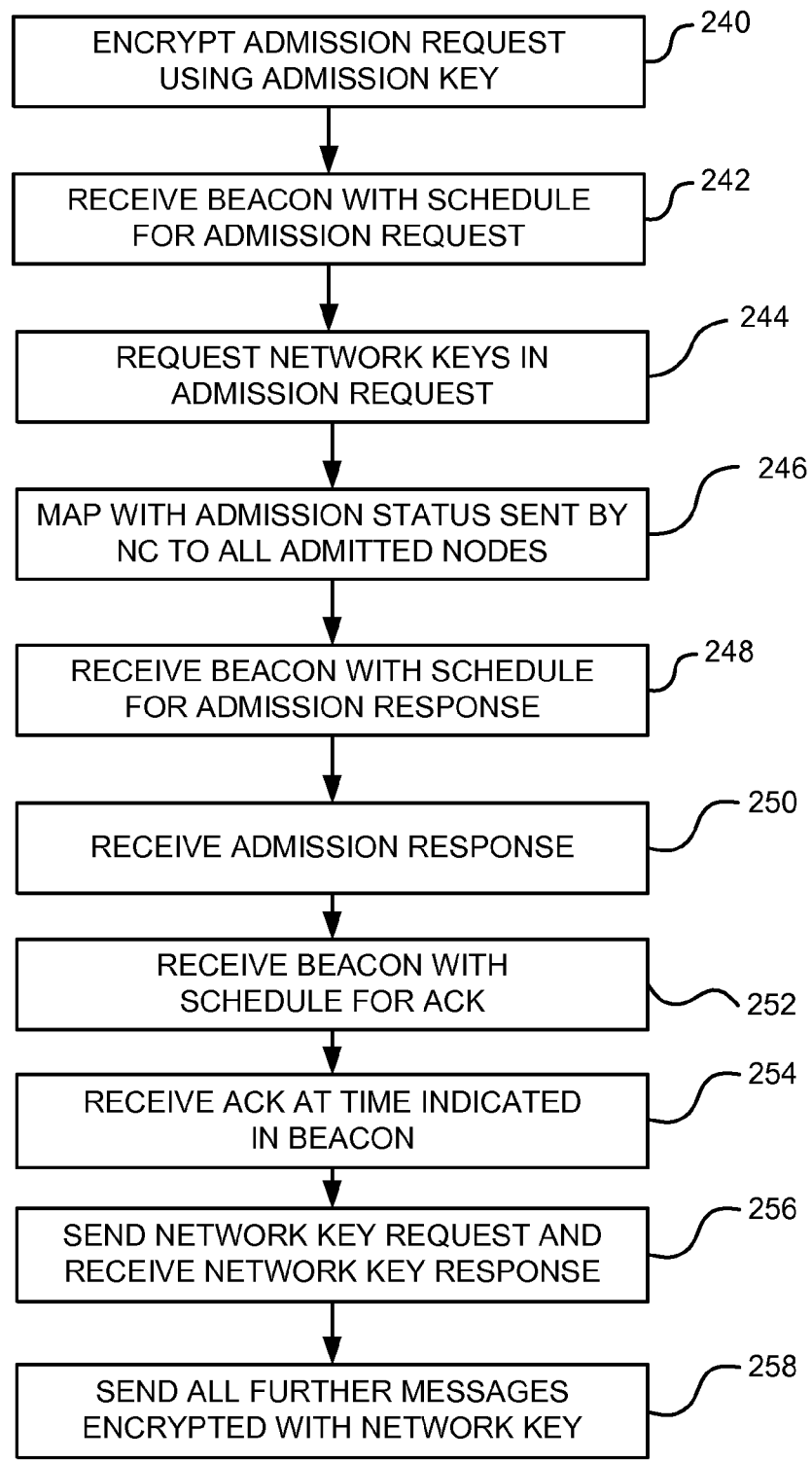
FIG. 5 is a flowchart illustrating a process for obtaining the dynamic keys in accordance with one embodiment of the systems and methods described herein.
Figure 6:
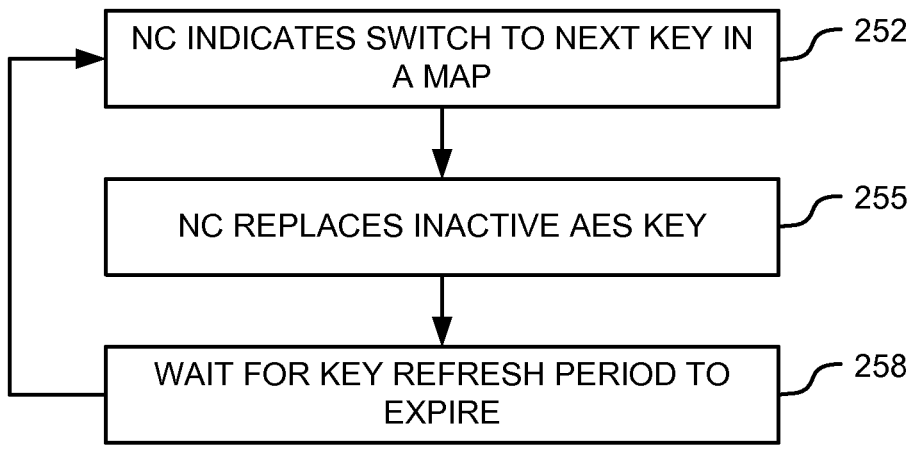
FIG. 6 illustrates an example key change process for the AES Privacy Management Key (APMK) and the AES Traffic Encryption Key (ATEK).

FIG. 5 illustrates the process used by one embodiment of the disclosed method and apparatus for requesting the dynamic keys. As shown in FIG. 5, the admission request 318 is encrypted using the static keys (STEP 240). In one embodiment, the AMMK is used. The NN 303 then receives a beacon message with the schedule for when to send the admission request 318 (STEP 242). The admission request 318 is then transmitted (STEP 244) during the admission slot indicated in the beacon message 317. After receiving the admission request 318, the NC 305 sends a MAP 320 that contains information regarding the state of the admission process (STEP 246). The MAP 320 is sent to all of the other nodes 307. However, the NN 303 will not be able to receive the MAP 320 since the format (i.e., the particular bitloading that is used) will not be known to the NN yet. Nonetheless, each of the other nodes 307 in the network have the format and can receive the MAP 320.

If the NN 303 does not include a request for an admission slot in the discovery request 311, the NC 305 will wait until receiving such a request before scheduling a time for the NN 303 to send an admission request 318.

Upon receipt of the admission request 318, the NC 305 schedules a slot in which an admission response 324 will be transmitted by the NC 305. The NC 305 then transmits the schedule in the next beacon message 322. The NN 303 receives the beacon message with the schedule for sending the admission response 324 (STEP 328) alerting the NN 303 to be ready to receive the admission response 324. Next, the NC 305 sends the admission response 324 at the time indicated by the beacon message 322. The NN 303 receives the admission response 324 encrypted by the AMMK (i.e., one of the two static keys) (STEP 250).

The NN 303 then receives the next beacon message 326 indicating when the NN 303 is to send an acknowledgement 328 that the NN 303 has successfully received the admission response (STEP 252). The NN 303 sends an acknowledgement 328 to the NC 305 encrypted by the AMMK indicating that the NN 303 has received the admission response (STEP 254). In one embodiment of the disclosed method and apparatus, the admission response 324 is the first a several admission process messages that are sent between the NC 305 and the NN 303. Each of the messages exchanged during this admission process are encrypted with the AMMK key. With the completion of these operations, the NN 303 is admitted to the network. At that point, the NN 303 can send a request for the dynamic keys to the NC 305. In one embodiment, the dynamic key request is encrypted by the APMKInitial key. The NC 350 will respond to the NN 303 by sending the dynamic keys. The response is also encrypted by the APMKInitial key (STEP 256). As noted above, the dynamic keys include two pairs of dynamic keys. The first pair includes the odd and even APMK. The second pair includes the odd and even ATEK.

Accordingly, all further messages to and from the NN 303 will be encrypted using the dynamic keys or the AMMK (STEP 258). From time to time, the NC 305 sends updated keys to the network nodes 303, 307 using the APMK. In this manner, keys are updated to provide an extra measure of security to the network.

The above example describes the generation of two static keys: AMMK and APMKInitial. An AES key generation function is used in one embodiment to generate the two static keys. The function accepts three arguments and returns a 128 bit static key. The key generation function applies a process known as RFC 2898/PKCS#5, which is defined by RSA labs. The process derives a static key from: an ASCII encoded password, P; a SALT value, S; and an ASCII encoded string, N.

In one embodiment, the static keys are calculated as follows:
1. T1=HMAC-SHA-256 (P, S∥N∥INT(1))
2. T2=HMAC-SHA-256 (P, T1)
n. Tn=HMAC-SHA-256 (P, Tn−1)
n+1. static key=(T1 XOR T2 XOR . . . XOR Tn)<0:127>
Where:
INT(1) is a four-byte long value encoding of the integer 1, most significant byte first (i.e., "0000 0000 0000 0001");
n is the iteration count of the function HMAC-SHA-256 and has a value 1000 as suggested by PKCS#5;
<0:127> indicates truncating the preceding value at the $128^{th}$ bit (i.e., the AESKey is the first 128 bits of the string T1 XOR T2 XOR . . . XOR Tn in step n+1);
S∥N∥INT(1) indicates that the value of S, N and INT(1) are concatenated to form a single argument;
HMAC-SHA-256(P, X)=SHA-256(P XOR opad∥SHA-256 (P XOR ipad∥X));
SHA-256 is a "SHA-2" hashing function as defined in FIPS 180-2;
ipad is the binary value of 36 (hexadecimal) repeated 64 times (i.e., "0011 0110 0011 0110 0011 0110 0011 0110 0011 0110 0011 0110"); and
opad is binary value of the 5C (hexadecimal) repeated 64 times.

As can be seen from the application of the above notation, HMAC-SHA-256(P, X) as defined in RFC 2104 and FIPS 180-2 is calculated by the following steps:
(1) Append zeros to the end of P to create a 64 byte string;
(2) XOR (bitwise exclusive-OR) the 64 byte string computed in step (1) with ipad;
(3) Append the stream of data X to the 64 byte string resulting from step (2);
(4) Apply SHA-256 to the stream generated in step (3);
(5) XOR (bitwise exclusive-OR) the 64 byte string computed in step (1) with opad;
(6) Append the SHA-256 result from step (4) to the 64 byte string resulting from step (5);
(7) Apply SHA-256 to the stream generated in step (6) and output the result;

When generating the static key, increasing the iteration count "n" increases the cost of producing keys from a password, but also has the benefit of increasing the difficulty of attack. Setting n to be 1000, for example, increases the cost of an exhaustive search (brute force attack) for passwords significantly, without a noticeable impact in the cost of deriving individual keys. In one embodiment, each network node implements a hardware key lockout time of at least 1 ms to prevent successive key updates. Alternatively, there is no lockout time. Given the minimum password space of 40 bits, it takes at least 2 raised to the $40^{th}$ power times 1 ms to exhaust searching through the entire password space in a brute force attack. That is equal to ≈35.2 years.

The manner in which the dynamic keys are generated is left up to the implementation and is not important to the disclosed method and apparatus. However, it should be noted that the SALT could be used in the generation of the dynamic keys as well.

The systems and methods described herein can also be used in a mixed mode MoCA network. A mixed mode MoCA network is a MoCA network that includes both MoCA 1.x (i.e., MoCA 1.0 and MoCA 1.1) and MoCA 2.0 nodes. Since MoCA 1.x does not use AES keys and does not use a SALT value, it is advantageous to upgrade the network operation as much as possible to conform with MoCA 2.0. Therefore, in a mixed mode MoCA network, when an NC handoff occurs and a MoCA 2.0 node accepts the NC role from a MoCA 1.x node, the MoCA 2.0 NC needs to distribute its permanent SALT to other existing MoCA 2.0 nodes to allow them to derive static keys using the SALT and the password without requiring the node to go through the admission procedure. In a mixed mode network that is already established, the MoCA 2.0 NC distributes dynamic keys (e.g. the ATEKs and APMKs) after an admission process initiated by new MoCA 2.0 nodes. However, before a new MoCA 2.0 node is admitted to such a mixed network, the NC must distribute the permanent SALT to the node in a network discovery message exchange.

Figure 7:
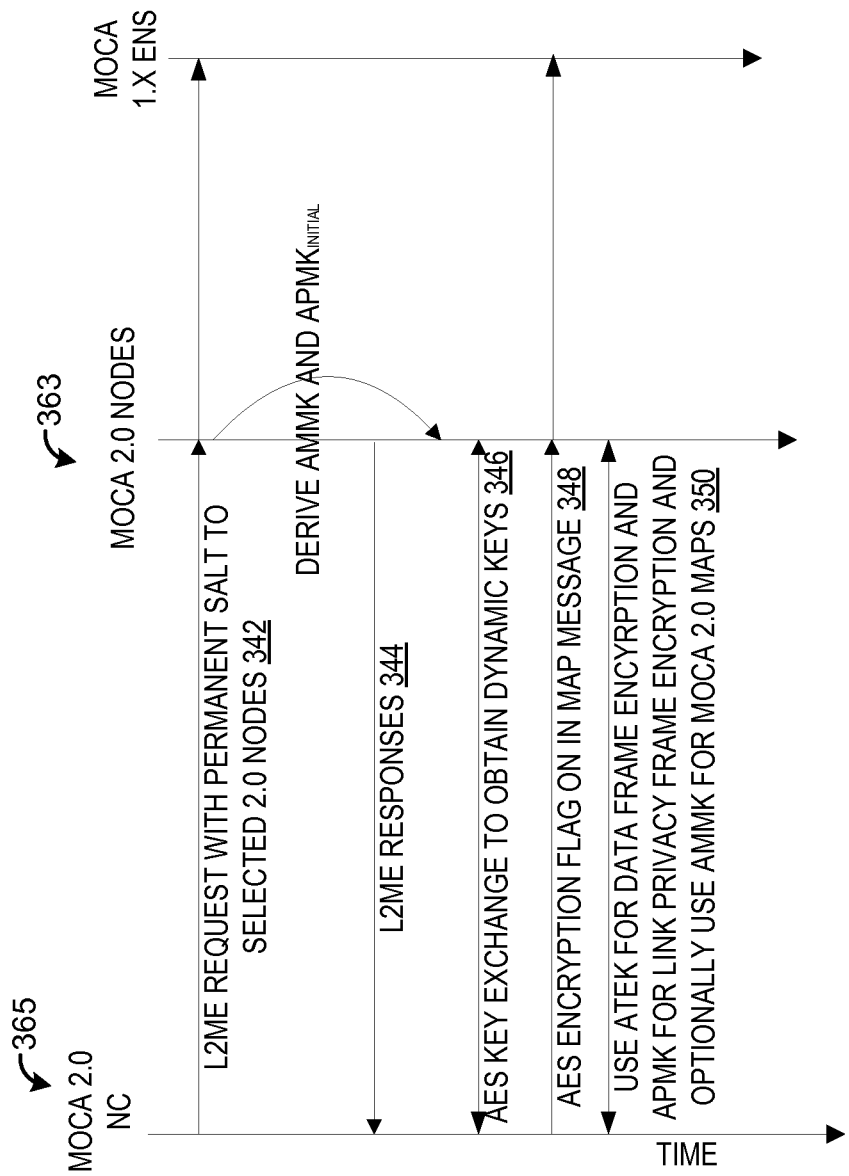
FIG. 7 is a diagram illustrating a wave mechanism initiated by the NC in accordance with one embodiment of the systems and methods described herein.

FIG. 7 is a diagram illustrating an example of a process initiated by the NC in accordance with one embodiment of the systems and methods described herein. As illustrated in this example, the NC 365 distributes a request 342 with a permanent SALT to selected MoCA 2.0 nodes 363 that are in the network. In one embodiment, the request 342 is an L2ME request. The MoCA 2.0 nodes 363 calculate static keys (AMMK and APMKInitial) using the SALT, the network password and an ASCII string. Alternatively, just the SALT and password are used. The nodes 363 submit their responses 344 encrypted by the AMMK. The nodes 363 and NC 365 exchange the dynamic keys as illustrated by 346. Then, an AES encryption flag within the MAP is enabled at 348. Future communications are encrypted among MoCA 2.0 nodes using the distributed AES dynamic keys, as shown by 350. In a mixed mode network, a MoCA 2.0 NC 365 distributes the permanent SALT using a current MoCA 1.x dynamic key (i.e., a key generated using the DES encryption technique, as opposed to the AES technique used for MoCA 2.0 nodes) to the set of existing MoCA 2.0 nodes that were admitted by a MoCA 1.x NC.

In a "Wave 0", the NC 365 specifies which of the MoCA 2.0 nodes are requested to participate. The MoCA 2.0 nodes are indicated using a "WAVE0_NODEMASK". In one embodiment, each bit of the WAVE0_NODEMASK represents one of the MoCA 2.0 nodes. Each of the requested nodes sends a response frame 344. The following constraints are observed on various fields of the request frame 344.

VENDOR_ID=0x0 (MoCA)
    TRANS_TYPE=0x2 (AES Key Distribution)
    TRANS_SUBTYPE=0x0 for Permanent SALT distribution
    WAVE0_NODEMASK=Set to indicate selected MoCA 2.0 nodes in the MoCA Network
    MSG PRIORITY=0xF0
    TXN_LAST_WAVE_NUM=2
    L2ME_PAYLOAD=as shown in Table 2

TABLE 2

L2ME_PAYLOAD of Request L2ME Frame for Wave 0

| Field | Length | Value |
|---|---|---|
| L2ME Request payload | | |
| PERMANENT_SALT | 96 bits | A random number. |

Each node responds to the NC with a response frame with the following constraints:
RESP_STATUS=Bit 0 set to '1'
    L2ME_PAYLOAD=as defined in Table 3.

TABLE 3

L2ME_PAYLOAD for Response L2ME Frame for Permanent SALT Distribution

| Field | Length | Usage |
|---|---|---|
| Response L2ME Payload for Create Flow/Update Flow | | |
| RESPONSE_CODE | 8 bits | RESPONSE_CODE_TRUE (0x01) if successful and RESPONSE_CODE_FALSE (0x00) otherwise. |
| RESERVED | 24 bits | Type III |

After successfully distributing the dynamic keys, the NC may then turn on the AES encryption flags in the MAPs that follow.

Figure 8:
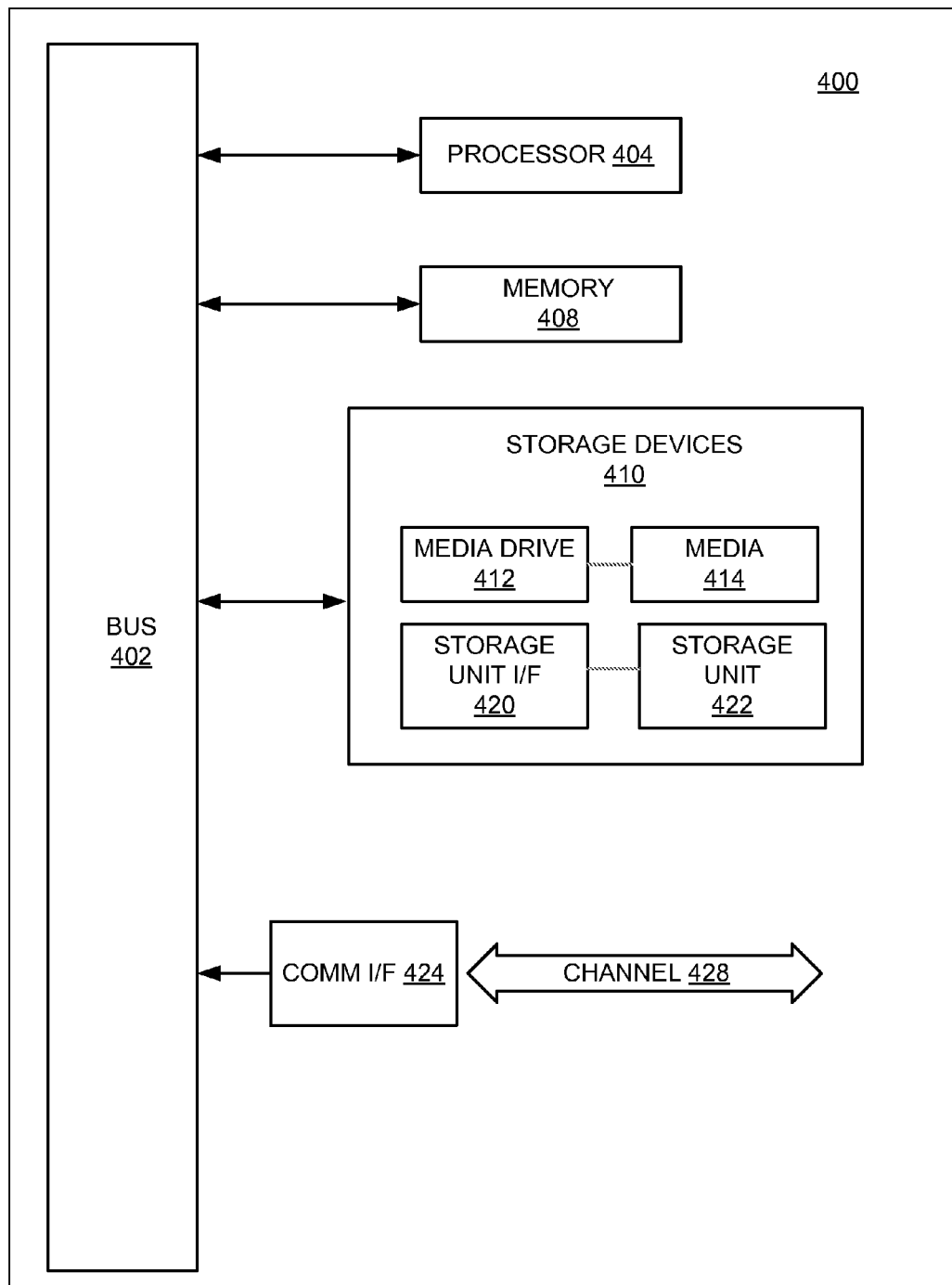
FIG. 8 illustrates an example computing module that may be used in implementing various features of embodiments of the disclosed method and apparatus.

Referring now to FIG. 8, computing module 400 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 400 might also represent computing capabilities embedded within or otherwise available to a given device. For example, a computing module 400 might be found in electronic devices such as, for example, digital cameras, navigation systems, cellular telephones, portable computing devices, modems, routers, wireless access points (WAPs), terminals and other electronic devices that might include some form of processing capability.

Computing module 400 might include, for example, one or more processors, controllers, control modules, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing module 400 or to communicate externally.

Computing module 400 might also include one or more memory modules, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing module 400 might likewise include a read only memory ("ROM") or other static storage device coupled to bus 402 for storing static information and instructions for processor 404.

The computing module 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a floppy disk drive, a magnetic tape drive, an optical disk drive, a CD or DVD drive (R or RW), or other removable or fixed media drive might be provided. Accordingly, storage media 414 might include, for example, a hard disk, a floppy disk, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing module 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory module) and memory slot, a PCMCIA slot and card, and other fixed or removable storage units 422 and interfaces 420 that allow software and data to be transferred from the storage unit 422 to computing module 400.

Computing module 400 might also include a communications interface 424. Communications interface 424 might be used to allow software and data to be transferred between computing module 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a MoCA channel over coaxial cable, phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 408, storage unit 420, and media 414. These and other various forms of computer program storage media or computer usable storage media may be involved in storing and providing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 400 to perform features or functions of the disclosed method and apparatus as discussed herein.

While various embodiments of the disclosed method and apparatus have been described above and shown in various figures, it should be understood that they have been presented by way of example only, and not of limitation. It should be understood that the various features, aspects and functionality described in one or more of the individual embodiments are not limited in their applicability to the particular embodiment with which they are described, but instead can be applied, alone or in various combinations, to one or more of the other embodiments of the disclosed method and apparatus, whether or not such embodiments are described and whether or not such features are presented as being a part of a described embodiment. Also, a multitude of different constituent module names other than those depicted herein can be applied to the various partitions. Additionally, with regard to flow diagrams, operational descriptions and method claims, the order in which the blocks are presented herein shall not mandate that various embodiments be implemented to perform the recited functionality in the same order unless the context dictates otherwise. Thus, the breadth and scope of the claimed invention should not be limited by any of the above-described embodiments which are presented as mere examples for illustration only.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide some of the many instances of the item in discussion, not an exhaustive or limiting list thereof; and the terms "a" or "an" should be read as meaning "at least one," "one or more" or the like. Likewise, where this document refers to technologies that would be apparent or known to one of ordinary skill in the art, such technologies encompass those apparent or known to the skilled artisan now or at any time in the future.

As used herein, the term module might describe a given unit of functionality that can be performed in accordance with one or more embodiments of the disclosed method and apparatus. As used herein, a module might be implemented using any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations.

Where components or modules of the disclosed method and apparatus are implemented in whole or in part using software, in one embodiment, these software elements can be implemented to operate with a computing or processing module capable of carrying out the functionality described with respect thereto. One such example a computing module is shown in FIG. 8. Various embodiments are described in terms of this example-computing module 400. After reading this description, it will become apparent to a person skilled in the relevant art how to implement the disclosed method and apparatus using other computing modules or architectures.

What is claimed is:

1. A method for generating security keys for a network comprising:
   assuming by a first node, capable of generating a SALT, role of a network coordinator (NC) of the network; and
   distributing the SALT to at least one other node within the network capable of using the SALT to generate an encryption key for encrypting admission messages, wherein:
   the SALT is distributed within a L2ME request; and
   the encryption key is generated by a hardware processor, based on a combining of the SALT distributed from the first node with a network password associated with the at least one other node; and
   receiving an L2ME response from the at least one other node.

2. The method of claim 1, wherein the L2ME response is encrypted by the encryption key.

3. The method of claim 2, wherein the encryption key comprises an AES MAC Management Key (AMMK).

4. The method of claim 3, wherein the AMMK is calculated by the at least one other node using the SALT combined with a network password.

5. The method of claim 3, wherein the AMMK is calculated by the at least one other node using the SALT combined with the network password and an American Standard Code for information interchange (ASCII) string.

6. The method of claim 1, further comprising exchanging dynamic keys with the at least one other node.

7. The method of claim 1, wherein the network comprises a mixed mode MoCA network.

8. The method of claim 7, wherein the role of network coordinator is handed off from a second node.

9. The method of claim 8, wherein the first node comprises a Multimedia over Coax Alliance (MoCA) 2.0 compliant node, and wherein the second node comprises a MoCA 1.0 compliant node.

10. The method of claim 9, wherein the at least one other node comprises an existing MoCA 2.0 compliant node.

11. The method of claim 10, wherein the SALT is distributed using a current MoCA 1.0 dynamic key.

12. The method of claim 11, wherein the at least one other node was previously admitted by the second node.

* * * * *